United States Patent
Nakayama et al.

(10) Patent No.: US 9,812,834 B2
(45) Date of Patent: Nov. 7, 2017

(54) ROTOR OF ROTATING ELECTRIC MACHINE

(71) Applicant: KABUSHIKI KAISHA TOSHIBA, Minato-ku (JP)

(72) Inventors: Shinya Nakayama, Yamato (JP); Daijiro Fukuda, Yokohama (JP); Yoshihiro Nomoto, Yokohama (JP); Hideyuki Nakamura, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 141 days.

(21) Appl. No.: 14/958,189

(22) Filed: Dec. 3, 2015

(65) Prior Publication Data

US 2016/0164236 A1 Jun. 9, 2016

(30) Foreign Application Priority Data

Dec. 3, 2014 (JP) ................. 2014-245300

(51) Int. Cl.
*H01R 39/08* (2006.01)
*H01R 39/34* (2006.01)
*H02K 13/02* (2006.01)

(52) U.S. Cl.
CPC ............. *H01R 39/34* (2013.01); *H01R 39/08* (2013.01); *H02K 13/02* (2013.01)

(58) Field of Classification Search
CPC ...... H02K 13/003; H02K 13/02; H02K 5/141; H02K 7/003; H02K 17/22
(Continued)

(56) References Cited

U.S. PATENT DOCUMENTS 2,798,977 A 7/1957 Henter
3,524,090 A 8/1970 Sark
(Continued)

FOREIGN PATENT DOCUMENTS

JP 60-109744 A 6/1985
JP 8-51766 A 2/1996
(Continued)

OTHER PUBLICATIONS

Extended European Search Report dated May 30, 2016 in Patent Application No. 15197231.2.
(Continued)

*Primary Examiner* — Thanh Lam
(74) *Attorney, Agent, or Firm* — Oblon, McClelland, Maier & Neustadt, L.L.P.

(57) ABSTRACT

According to one embodiment, a rotor of a rotating electric machine includes a collector shaft which is fastened to a main shaft of the machine and mounted with paired collector rings on an outer circumferential surface thereof. Longitudinal lead bars extend in electrically insulated state in longitudinal lead grooves provided in an outer circumferential surface of the collector shaft and are connected to ring through studs. Radial lead bars are located at a collector shaft-side end portion of the main shaft and connect at their inner end portions to the bands. And, both ends of conductive longitudinal studs inserted into longitudinal through holes at a main shaft-side end portion of the collector shaft are connected to outer end portions of the radial lead bars and to the longitudinal lead bars.

16 Claims, 8 Drawing Sheets

(58) Field of Classification Search
USPC ................ 310/231, 232, 233, 236, 249, 251
See application file for complete search history.

(56) References Cited

U.S. PATENT DOCUMENTS

| | | | | |
|---|---|---|---|---|
| 4,083,639 | A * | 4/1978 | Terry | F16D 1/0876 403/16 |
| 5,124,608 | A * | 6/1992 | Lawrence | H01R 39/64 310/143 |
| 5,739,618 | A * | 4/1998 | Kleinburger | H02K 13/02 310/232 |
| 2003/0155835 | A1* | 8/2003 | Kondo | H01R 39/08 310/232 |
| 2007/0257577 | A1* | 11/2007 | Bizjak | H01R 39/14 310/232 |
| 2012/0217840 | A1* | 8/2012 | Kikuichi | H02K 13/02 310/232 |

FOREIGN PATENT DOCUMENTS

| | | |
|---|---|---|
| JP | 4832618 | 12/2011 |
| WO | WO 02/052699 A2 | 7/2002 |

OTHER PUBLICATIONS

Office Action dated Nov. 23, 2016 in Korean Patent Application No. 10-2015-0169721 (with English translation).

* cited by examiner

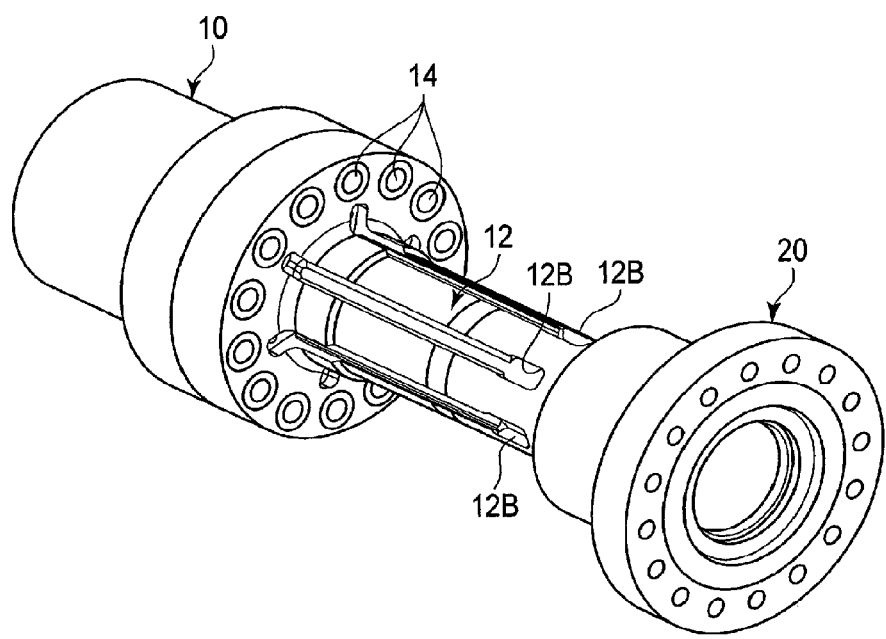
F I G. 3
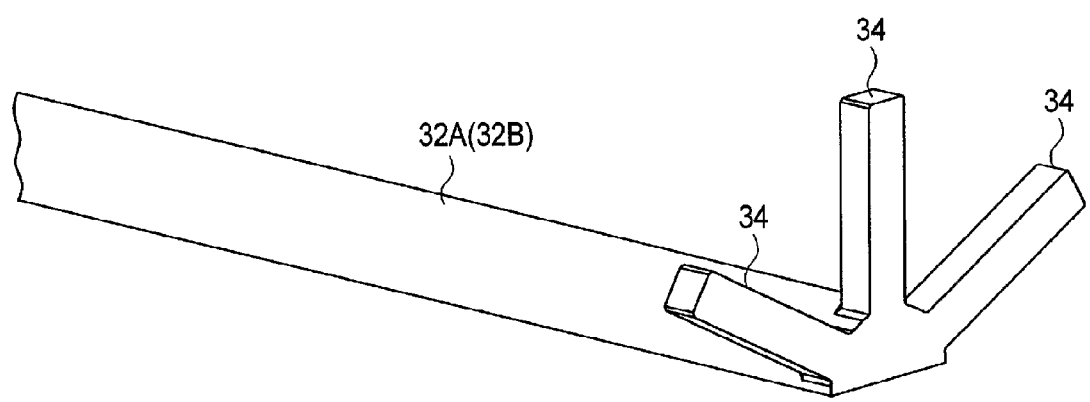
F I G. 4

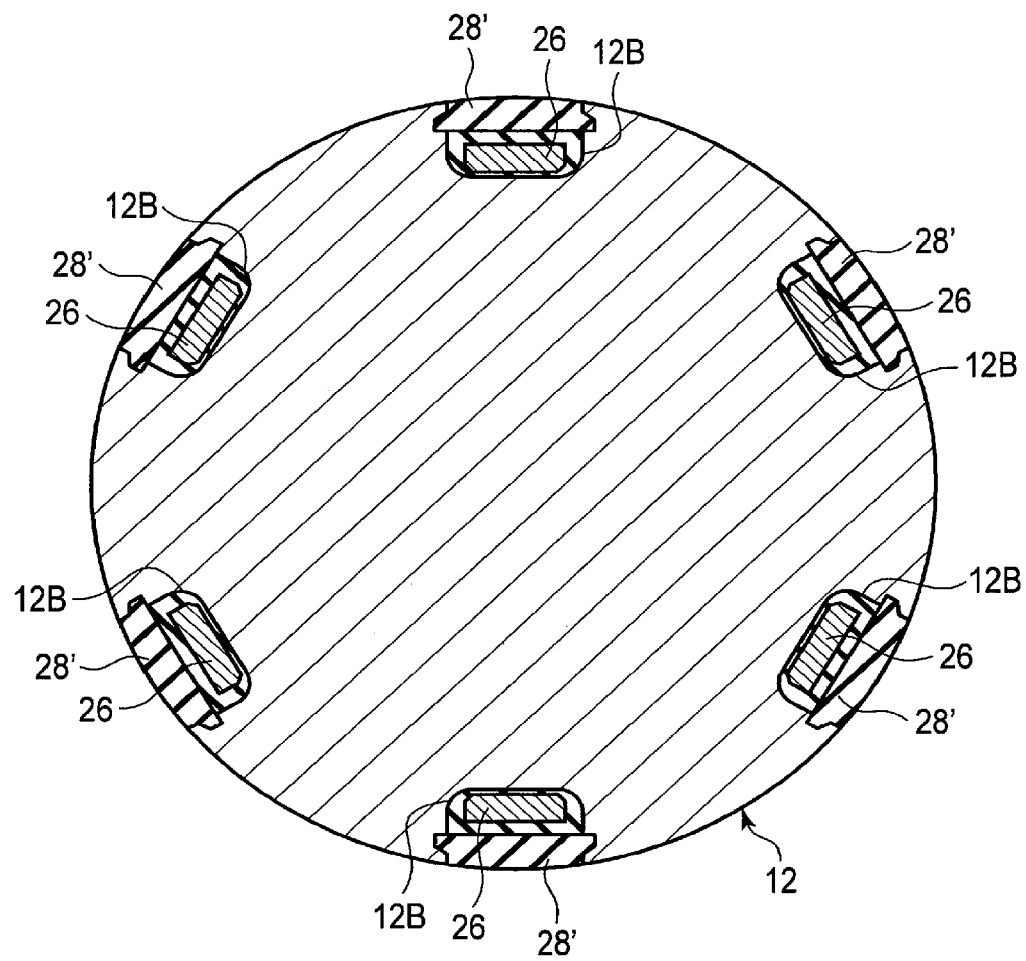
F I G. 8

ROTOR OF ROTATING ELECTRIC MACHINE

CROSS-REFERENCE TO RELATED APPLICATION

This application is based upon and claims the benefit of priority from Japanese Patent Application No. 2014-245300 filed Dec. 3, 2014, the entire contents of which are incorporated herein by reference.

FIELD

Embodiments described herein relate generally to a rotor of a rotating electric machine.

BACKGROUND

In order to excite magnetically a rotor of a rotating electric machine, for example a turbine generator, it is need to supply a field current to a field winding. As means for this, a system in which a carbon brush is in sliding contact with a collector ring to supply current directly to a rotating body has been generally known.

FIG. 9 shows an example of a conventional structure of a rotor 100 of a general rotating electric machine using the above described collector ring. Collector rings 102A and 102B paired on positive and negative electrode sides are usually located in an outside of the machine on a side of the rotor 100 opposite to a directly coupled side thereof. The Collector rings 102A and 102B are insulated and held to a rotor main shaft 104 as a hollow rotor shaft through collector ring insulating cylinders 103.

Center hole copper bands 106A and 106B on the positive and negative electrode sides are arranged in a shaft center portion of the hollow rotor main shaft 104 in such a state that they are insulated from each other. The paired collector rings 102A and 102B are electrically connected respectively to the center hole copper bands 106A and 106B on the positive and negative electrode sides by connecting collector studs 110A and 110B penetrating respectively through holes 108A and 108B provided radially. And the center hole copper bands 106A and 106B are similarly connected to a field winding of the rotor 100 by connecting studs or the like, so that a field current is supplied to the field winding.

In particular, in a system in which an inside of an electric power generator is cooled by hydrogen, a hydrogen seal packing 112 is provided at a periphery of an outer projecting portion of each of the collector studs 110A and 110B connected to the center hole copper bands 106A and 106B. A hydrogen seal plug 114 is mounted in an opening of a center hole 104A of the rotor main shaft 104.

Although a drive system of the electric power generator shown in FIG. 9 has a drive device, such as a steam turbine, provided on only one side, there is another drive system of the electric power generator in which an electric power generator GN is driven by a steam turbine ST and a gas turbine GT from both sides of the electric power generator GN, as shown in FIG. 10.

In the both drive system, a transmission torque corresponding to a turbine output is applied to the rotor main shaft 104 on the side where the collector rings are located. Thus, torsional stress is produced in the rotor main shaft 104 on the side where the collector rings are located during the rotor main shaft 104 is driven as described above. When a short-circuit accident or the like occurs, an excessive torque is applied to the rotor main shaft 104 on the side where the collector rings are located.

In the structure of the rotor of the rotating electric machine shown in FIG. 9, since the through holes 108A and 108B exist radially in the rotor main shaft 104 as a hollow rotor shaft, torsional stress is concentrated around the through holes 108A and 108B in the rotor main shaft 104.

Although the through holes 108A and 108B are provided at portions of the collector rings 102A and 102B, it is difficult to increase a diameter of the rotor main shaft 104 because the outer diameters of the collector rings 102A and 102B are restricted by peripheral speeds of carbon brush sliding surfaces of the collector rings 102A and 102B.

Another conventional hollow collector shaft is formed independently from a rotor main shaft and coupled to the rotor main shaft by a coupling. A pair of center hole copper bands electrically connected to a pair of center hole copper bands of a center hole of the rotor main shaft is arranged in a center hole of the collector shaft. A pair of collector rings is fitted on both sides of a longitudinal central portion of an outer circumferential surface of this collector shaft, and the central portion has an outer diameter larger than that of each of the paired collector rings. In order to fit the pair of collector rings on the both sides of the longitudinal central portion of the outer circumferential surface of the collector shaft, the coupling for coupling the collector shaft to the rotor shaft is fitted to an end of the outer circumferential surface of the collector shaft by an shrinkage-fit.

A pair of radial through holes through which a pair of axial studs is inserted is formed in the central portion. The pair of axial studs extends from the pair of center hole copper bands of the center hole of the collector shaft to a pair of recesses of an outer circumferential surface of the central portion. The pair of collector rings is provided with a pair of lead bars longitudinally extending toward the pair of recesses. The pair of lead bars extends to outer ends of the pair of axial studs located in the pair of recesses in a pair of longitudinally extending grooves formed in the outer circumferential surface of the large-diameter central portion and is electrically connected to the outer ends of the pair of axial studs.

The conventional collector shaft makes the outer diameter of the central portion in which the through holes for the pair of axial studs are formed being larger than the outer diameter of the pair of collector rings to increase its strength to torsional stress. However, since the center hole and the pair of through holes extending radially remain in the collector shaft, the strength of the collector shaft to the torsional stress is still reduced. The work for shrink-fitting the coupling on the one end portion of the outer circumferential surface of the collector shaft is complicated. Further, the work for removing or shrink-fitting the coupling from or to the one end portion of the outer circumferential surface of the collector shaft is troublesome when each of replacement and repair of the pair of collector rings is performed.

BRIEF DESCRIPTION OF THE DRAWINGS

FIG. 3 is a perspective view showing the rotor main shaft and collector shaft of the first embodiment and a coupling fitted on a one end portion of an outer circumferential surface of the collector shaft by a shrink-fitting;

FIG. 4 is a perspective view showing a center hole copper band of the rotor main shaft of the rotating electric machine and radial lead bars connected to the center hole copper band in the first embodiment;

FIG. 8 is a cross-sectional view showing longitudinal lead bars and lead bar wedges in a collector shaft of a rotating electric machine of a fifth embodiment;

DETAILED DESCRIPTION

In general, according to one embodiment, a rotor of a rotating electric machine includes a rotor main shaft of the rotating electric machine and a pair of center hole copper bands arranged in a shaft center portion of the rotor main shaft and held in an insulated state from each other. A collector shaft is fastened to a shaft end of the rotor main shaft and mounted with a pair of collector rings which supply a field current, on an outer circumferential surface thereof. A plurality of longitudinal lead bars is inserted in and electrically insulated from lead grooves which are provided in an outer circumferential surface of the collector shaft to extend along a longitudinal direction of the collector shaft, and connected to the collector rings through conductive studs. A plurality of radial lead bars is arranged at a shaft end portion of the rotor main shaft, the shaft end portion being located on a coupling side with the collector shaft, and includes inner end portions connected to the center hole copper bands. And, a plurality of conductive longitudinal studs is inserted into a plurality of longitudinal through holes provided at a shaft end portion of the collector shaft to extend along a longitudinal direction of the collector shaft, the shaft end portion being located on a coupling side with the rotor main shaft, and includes one end portions connected to outer end portions of the radial lead bars and the other end portions connected to the longitudinal lead bars.

Hereinafter, various embodiments will be described with reference to FIGS. 1 to 8 of the accompanying drawings.

First Embodiment

Figure 1:
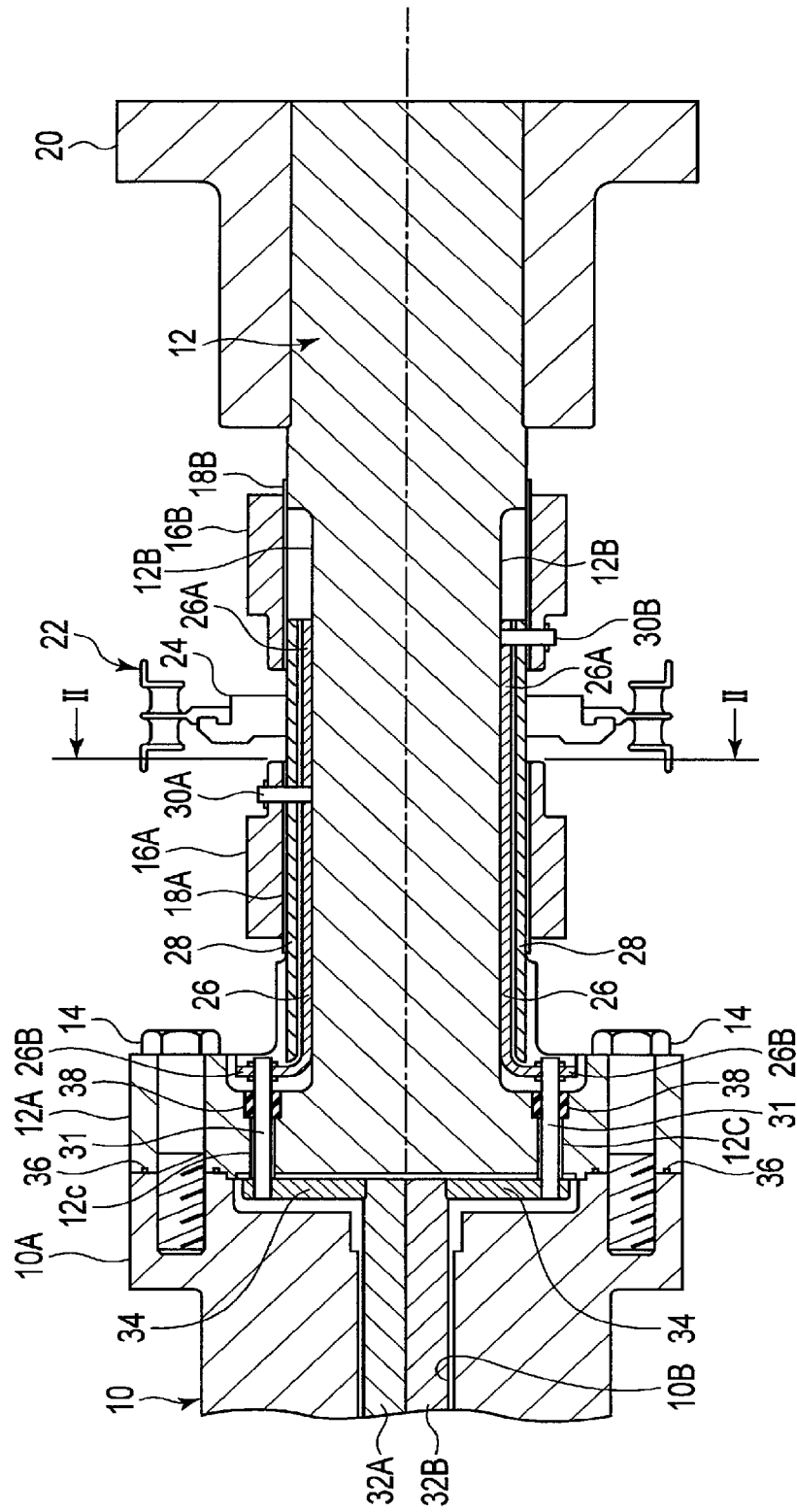
FIG. 1 is a longitudinal cross-sectional view showing a coupling portion between a collector shaft and a rotor main shaft in a rotating electric machine of a first embodiment.

<Configuration>
Hereinafter, some embodiments will be described with reference to the drawings. FIGS. 1 to 4 show a first embodiment. FIG. 1 is a longitudinal cross-sectional view showing a rotor main shaft 10 of a rotating electric machine such as an electric generating rotor, of this embodiment and a collector shaft 12 connected to the rotor main shaft 10. A large-diameter connecting flange 10A is provided at a shaft end portion of the rotor main shaft 10, and a large-diameter connecting flange 12A is provided at one shaft end portion of the collector shaft 12. A rotor of the rotating electric machine of this embodiment is configured by abutting the connecting flange 12A of the collector shaft 12 on the connecting flange 10A of the rotor main shaft 10 and then by fastening and fixing the collector shaft 12 to the rotor main shaft 10 by fastening bolts 14. The collector shaft 12 is provided with a pair of collector rings (for example, a first collector ring 16A on a positive electrode side and a second collector ring 16B on a negative electrode side) for supplying a field current to a field winding provided on the rotor main shaft 12. The first collector ring 16A and the second collector ring 16B are fixed on an outer circumferential surface of the collector shaft 12 by shrink-fitting or the like respectively with collector ring insulating cylinders 18A and 18B for ground insulation purposes being interposed between them. When another shaft is further connected to another shaft end portion of the collector shaft 12, a coupling 20 is shrink-fitted on the other shaft end portion of the collector shaft 12 as shown in FIG. 1 and the other shaft can be connected to the other shaft end portion of the collector shaft 12 by using the shrink-fitted coupling 20. Consequently, a shaft structure of the rotor of the rotating electric machine of this embodiment is constituted of the rotor main shaft 10 and the collector shaft 12 connected and fixed to the rotor main shaft 10 or a plurality of splitted shafts including the collector shaft 12.

For a purpose of cooling a collector portion and discharging carbon dust, a collector fan 22 is attached to the collector shaft 12 through a collector fan boss 24. In FIG. 1, although the collector fan 22 and the collector fan boss 24 are arranged between the first collector ring 16A and the second collector ring 16B, if the collector fan 22 and the collector fan boss 24 are arranged at least one of the shaft end portions of the collector shaft 12, similar functions are ensured.

The first collector ring 16A and the second collector ring 16B both of which are shrink-fitted on the outer circumferential surface of the collector shaft 12 are in sliding contact with carbon brushes (not shown), whereby a field current can be supplied to the field windings of the rotor.

Figure 2:
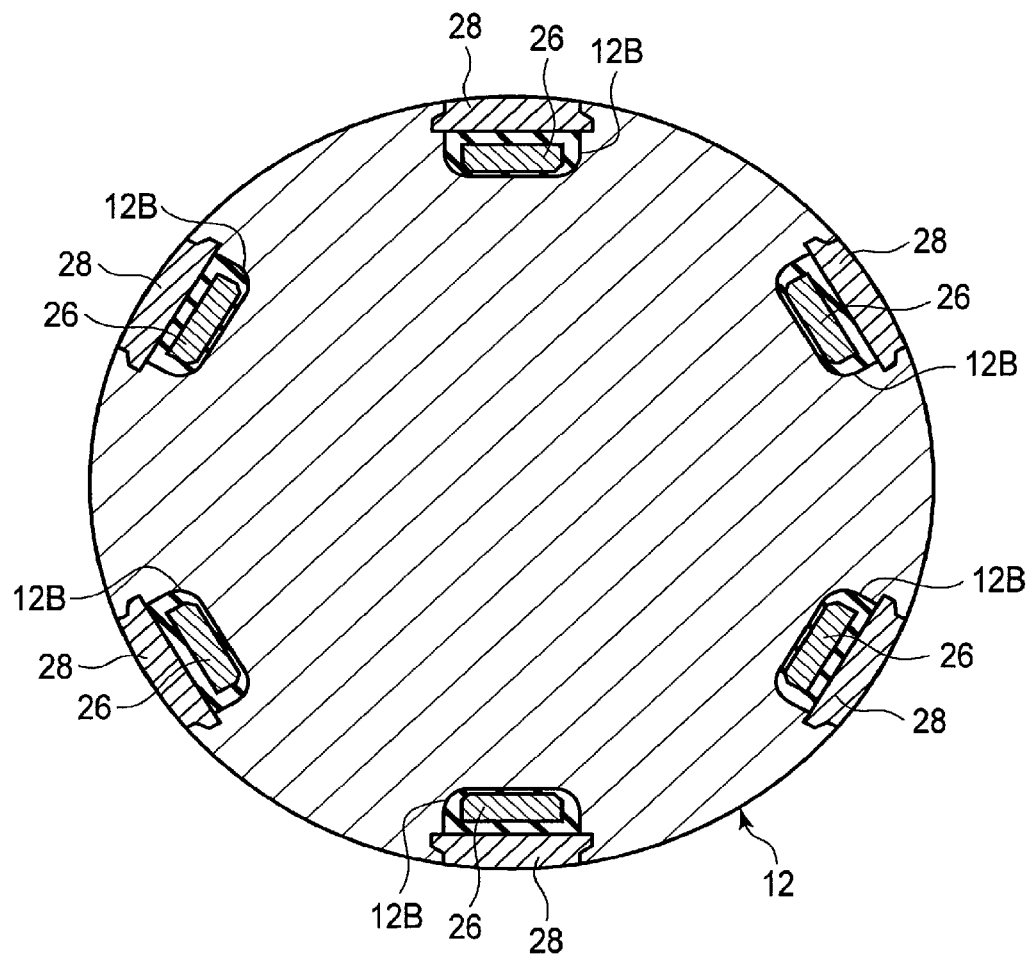
FIG. 2 is a cross-sectional view along a II-II line of FIG. 1.

As shown in FIGS. 2 and 3, an even number of (six in this embodiment) lead grooves 12B are provided in the outer circumferential surface of the collector shaft 12 to extend along a longitudinal direction of the collector shaft 12. Here, the lead grooves 12B are evenly arranged at equal intervals in a circumferential direction of the collector shaft 12. All of the lead grooves 12B have the same length in the longitudinal direction of the collector shaft 12.

In each of the lead grooves 12B, a longitudinal lead bar 26 is firstly inserted with being wrapped by an electrically insulating member and then a lead bar retainer 28 is inserted in and engaged with an opening of each of the lead grooves 12B to close the opening of each of the lead grooves 12B. The longitudinal lead bar 26 wrapped by the electrically insulating member is pressed on an inner bottom of each of the lead grooves 12B by the lead bar retainer 28. Consequently, the longitudinal lead bar 26 is held in each of the lead grooves 12B by the lead bar retainer 28 against a centrifugal force generated when the rotor rotates.

Each of the longitudinal lead bars 26 has a linear lead bar body 26A inserted in the lead groove 12B and a curved portion 26B provided at a rotor main shaft-side distal end portion of the lead bar body 26A and curved into a substantially L-shape. All the longitudinal lead bars 26 have the same size as to each other and are formed to have the same shape as to each other. A base end portion of the lead bar body 26A of each of the longitudinal lead bars 26 extends to a position corresponding to a portion of the second collector ring 16B.

Among the longitudinal lead bars 26 in the lead grooves 12B, half of the longitudinal lead bars 26, in this embodiment three longitudinal lead bars 26, are connected to the first collector ring 16A through conductive first collector studs 30A. The remaining half of the longitudinal lead bars 26, in this embodiment remaining three longitudinal lead bars 26, are connected to the second collector ring 16B through conductive second collector studs 30B. Here, ground insulation is applied to each of the first collector studs 30A, the second collector studs 30B and the longitudinal lead bars 26 as the first collector ring 16A and the second collector ring 16B.

In the connecting flange 12A of the collector shaft 12, longitudinal through holes 12C having the same number as that of the longitudinal lead bars 26 are provided to extend along the longitudinal direction of the collector shaft 12. The longitudinal through holes 12C are arranged in the circumferential direction of the collector shaft 12 at the same circumferential positions as the lead grooves 12B. In each of the longitudinal through holes 12C, a bar-shaped longitudinal stud 31 is inserted with ground insulation to the longitudinal through hole 12C. A based end portion of each of the longitudinal studs 31 is connected to the distal end curved portion 26B of the longitudinal lead bar 26.

In a radial center portion of the rotor main shaft 10, a center hole 10B is provided to extend in an longitudinal direction of the rotor main shaft 10. In the center hole 10A, a pair of center hole copper bands (a center hole copper band 32A on the positive electrode side and a center hole copper band 32B on the negative electrode side) are inserted and held with being insulated from each other. Each of the center hole copper bands 32A and 32B is formed to have a semicircular cross-sectional shape. A base end of each of the center hole copper bands 32A and 32B is connected to the field winding (not shown) of the rotor.

At collector shaft-side end portion of the rotor main shaft 10, radial lead bars 34 corresponding to the longitudinal lead bars 26 of the collector shaft 12 are arranged. The radial lead bars 34 extend in a radiation direction from a radial center of the rotor main shaft 10 and are arranged at equal intervals in a circumferential direction of the rotor main shaft 10. As shown in FIG. 4, the inner end portions of half (three in this embodiment) of the radial lead bars 34 are connected to a collector shaft-side distal end portion of the center hole copper band 32A on the positive electrode side. The inner end portions of the remaining half (remaining three in this embodiment) of the radial lead bars 34 are connected to a collector shaft-side distal end portion of the center hole copper band 32B on the negative electrode side. Here, the inner end portion of each of half of the radial lead bars 34 is connected to the distal end portion of the center hole copper band 32A by welding for example, and the inner end portion of each of remaining half of the radial lead bars 34 is connected to the distal end portion of the center hole copper band 32B by welding for example.

Outer end portions of the radial lead bars 34 connected to the center hole copper band 32A on the positive electrode side are connected to distal end portions of the longitudinal studs 31 connected to the first collector ring 16A through the half of the longitudinal lead bars 26. Outer end portions of the radial lead bars 34 connected to the center hole copper band 32B on the negative electrode side are connected to distal end portions of the longitudinal studs 31 connected to the second collector ring 16B through the remaining half of the longitudinal lead bars 26.

An inside of the rotating electric machine of this embodiment is cooled by hydrogen. In such a cooling system as described above, there is a need to have a structure that prevents hydrogen from leaking outside the machine. In the rotor of the rotating electric machine of this embodiment, a hydrogen seal O-ring 36 is inserted in a connecting portion between the rotor main shaft 10 and the collector shaft 12, that is between the large-diameter connecting flange 10A of the rotor main shaft 10 and the large-diameter connecting flange 12A of the collector shaft 12. Further, a hydrogen seal packing 38 is mounted in each of the longitudinal through holes 12C of connecting flange 12A of the collector shaft 12. The hydrogen sealing structure of the rotating electric machine of this embodiment is configured by the hydrogen seal O-ring 36 and the hydrogen seal packings 38.

<Operation>

In the rotor of the rotating electric machine of this embodiment configured as described above, the first collector ring 16A on the positive electrode side and the second collector ring 16B on the negative electrode side are in sliding contact with the carbon brushes (not shown), whereby a field current is supplied to the field windings of the rotor. Here, the first collector ring 16A is electrically connected to the center hole copper band 32A on the positive electrode side sequentially through the first collector studs 30A, the half of the longitudinal lead bars 26, the half of the longitudinal studs 31, and the half of the radial lead bars 34. Similarly, the second collector ring 16B is electrically connected to the center hole copper band 32B on the negative electrode side sequentially through the remaining half of the second collector studs 30B, the remaining half of the longitudinal lead bars 26, the remaining half of the longitudinal studs 31, and the remaining half of the radial lead bars 34. Further, the center hole copper band 32A on the positive electrode side and the center hole copper band 32B on the negative electrode side are electrically connected to the field winding of the rotor (not shown).

<Effect>

Thus, the above configuration provides the following effect. Namely, in the rotor of the rotating electric machine of this embodiment, the longitudinal lead bars 26 are arranged in the lead grooves 12B provided in the outer circumferential surface of the collector shaft 12 to extend along the longitudinal direction of the collector shaft 12. The first collector ring 16A on the positive electrode side is electrically connected to the half of the longitudinal lead bars 26 through the half of the first collector studs 30A, and the second collector ring 16B on the negative electrode side is electrically connected to the remaining half of the longitudinal lead bars 26 through the remaining half of the second collector studs 30B. Further, the half of the longitudinal lead bars 26 is electrically connected to the half of the radial lead bars 34 of the center hole copper band 32A in the rotor main shaft 10 through the half of the longitudinal studs 31, and the remaining half of the longitudinal lead bars 26 is electrically connected to the remaining half of the radial lead bars 34 of the center hole copper band 32A in the rotor main shaft 10 through the remaining half of the longitudinal studs 31. Therefore, the collector shaft 12 has no conventional center hole 104A and no conventional radial through holes 108B for the conventional radial studs 110A and 110B between the outer circumferential surface of the conventional collector shaft 104 and the conventional center hole 104A.

Accordingly, in a condition in which a torque is applied to the collector shaft 12, it can be avoided that excessive concentration of stress is applied on each the portions of the collector shaft 12 on which the first and second collector rings 16A and 16B are fitted.

Further, since the radial lead bars 34 for the center hole copper bands 32A and 32B of the rotor main shaft 10 are arranged on the collector shaft-side end portion of the rotor main shaft 10, it is no need to provide radial through holes for the radial lead bars 34 in the rotor main shaft 10 so that no concentration of torque stress is generated in the collector shaft-side end portion of the hollow rotor main shaft 10 when a torque is applied to the hollow rotor main shaft 10.

If there is anisotropy in bending rigidity in a rotating body like the collector shaft 12, vibration which is N times a synchronous rotational speed is excited. In this embodiment, an even number of lead grooves 12B, six lead grooves 12B in this embodiment, is provided in the outer circumferential surfaces of the collector shaft 12 to extend along the longitudinal direction of the collector shaft 12, and the lead grooves 12B are evenly arranged at equal intervals in the circumferential direction of the collector shaft 12. Thus, the bending rigidity is uniform in the collector shaft 12. In FIG. 2, although the six lead grooves 12B are provided in the outer circumferential surface of the collector shaft 12, the number of the lead grooves 12B may be an arbitrary even number according to a value of the field current flown in the longitudinal lead bars 26 arranged in the lead grooves 12B.

In this embodiment, all the lead grooves 12B have the same length as to each other in the longitudinal direction of the collector shaft 12 regardless of positions of the first and second collector rings 16A and 16B on the outer circumferential surface of the collector ring 12 in the longitudinal direction of the collector ring 12. This makes the bending rigidity of the collector shaft 12 in any cross-section of the collector shaft 12 to be uniform, and prevents the collector shaft 12 from vibration during rotation of the collector shaft 12.

Further, in this embodiment, since the inner end portions of the half of the radial lead bars 34 are fixed to the distal end portion of the center hole copper band 32A by welding and the inner end portions of the remaining half of the radial lead bars 34 are fixed to the distal end portion of the center hole copper band 32B by welding, these mechanical fixation are strong and electrical connection between them are strong.

Second Embodiment

<Configuration>

Figure 5:
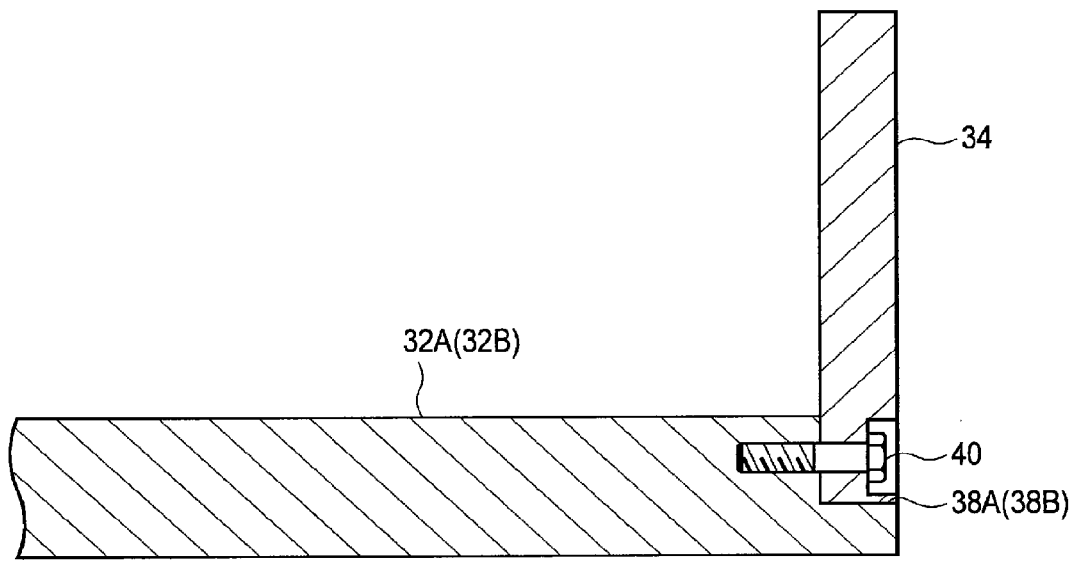
FIG. 5 is a longitudinal cross-sectional view showing a center hole copper band of a rotor main shaft of a rotating electric machine and one of radial lead bars connected to the center hole copper band in a second embodiment.

FIG. 5 shows a second embodiment. In this embodiment, cutouts 38A for positioning the inner end portions of the half of the radial lead bars 34 are formed in corner of the distal end portion of the center hole copper band 32A, and cutouts 38B for positioning the inner end portions of the remaining half of the radial lead bars 34 are formed in corner of the distal end portion of the center hole copper band 32B. And, the inner end portions of the half of the radial lead bars 34 engaged in the cutouts 38A of the distal end portion of the center hole copper band 32A are fixed to the distal end portion of the center hole copper band 32A by fixing bolts 40, and also the inner end portions of the remaining half of the radial lead bars 34 engaged in the cutouts 38B of the distal end portion of the center hole copper band 32B are fixed to the distal end portion of the center hole copper band 32B by the fixing bolts 40.

<Operation/Effect>

In this embodiment, the radial lead bars 34 fixed to the center hole copper bands 32A and 32B by the fixing bolts 40 prevent thermal strain and thermal distortion from generating in the inner end portions of the radial lead bars 34 and distal end portions of the center hole copper bands 32A and 32B by welding. Further, a work for fixing the inner end portions of the radial lead bars 34 to the distal end portions of the center hole copper bands 32A and 32B can be easier than that of the first embodiment.

Third Embodiment

<Configuration>

Figure 6:
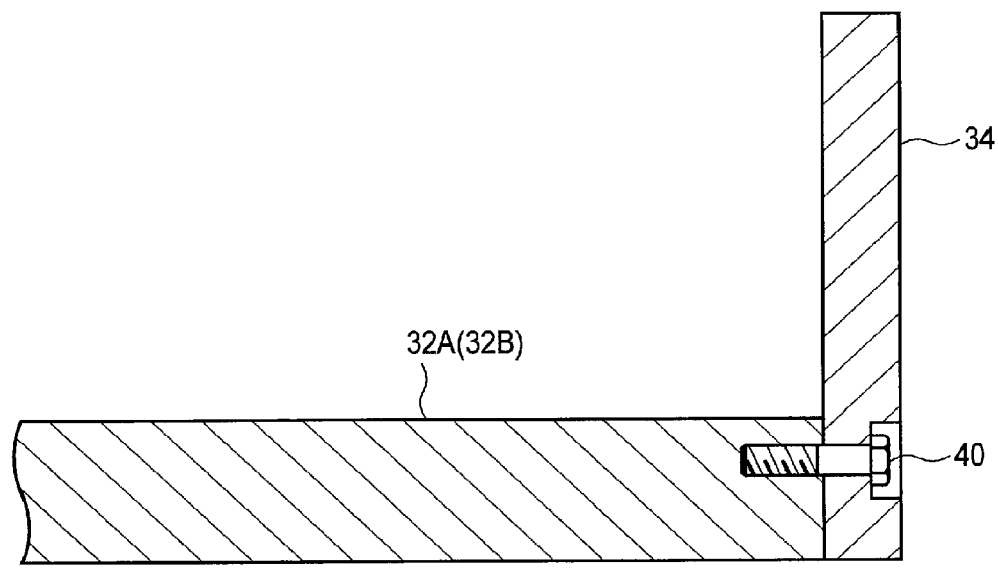
FIG. 6 is a longitudinal cross-sectional view showing a center hole copper band of a rotor main shaft of a rotating electric machine and one of radial lead bars connected to the center hole copper band in a third embodiment.

FIG. 6 shows a third embodiment. In this embodiment, cutouts for positioning the inner end portions of the half of the radial lead bars 34 are not formed in the corner of the distal end portion of the center hole copper band 32A, and cutouts for positioning the inner end portions of the remaining half of the radial lead bars 34 are not formed in corner of the distal end portion of the center hole copper band 32B. And, the inner end portions of the half of the radial lead bars 34 are directly fixed to the end surface of the distal end portion of the center hole copper band 32A by the fixing bolts 40 while the inner end portions of the half of the radial lead bars 34 are directly abutted to the end surface of the distal end portion of the center hole copper band 32A. And, also the inner end portions of the remaining half of the radial lead bars 34 are directly fixed to the end surface of the distal end portion of the center hole copper band 32B by the fixing bolts 40 while the inner end portions of the remaining half of the radial lead bars 34 are directly abutted to the end surface of the distal end portion of the center hole copper band 32B.

<Operation/Effect>

In this embodiment, like in the second embodiment, the radial lead bars 34 fixed to the center hole copper bands 32A and 32B by the fixing bolts 40 prevent thermal strain and thermal distortion from generating in the inner end portions of the radial lead bars 34 and distal end portions of the center hole copper bands 32A and 32B by welding. Further, a manufacturing step for manufacturing the center hole copper bands 32A and 32B can be more simple because there is no need to form the cutouts in the corners of the distal end portions of the center hole copper bands 32A and 32B. Of course, the work for fixing the inner end portions of the radial lead bars 34 to the distal end portions of the center hole copper bands 32A and 32B can be easier than that of the second embodiment.

Fourth Embodiment

<Configuration>

Figure 7:
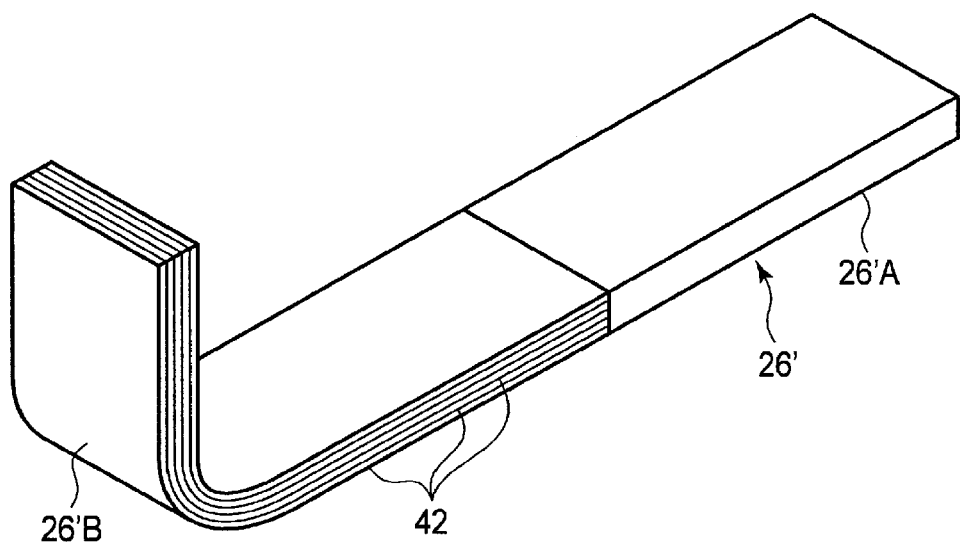
FIG. 7 is a perspective view showing a longitudinal lead bar of a collector shaft of a rotating electric machine in a fourth embodiment.
Figure 9:
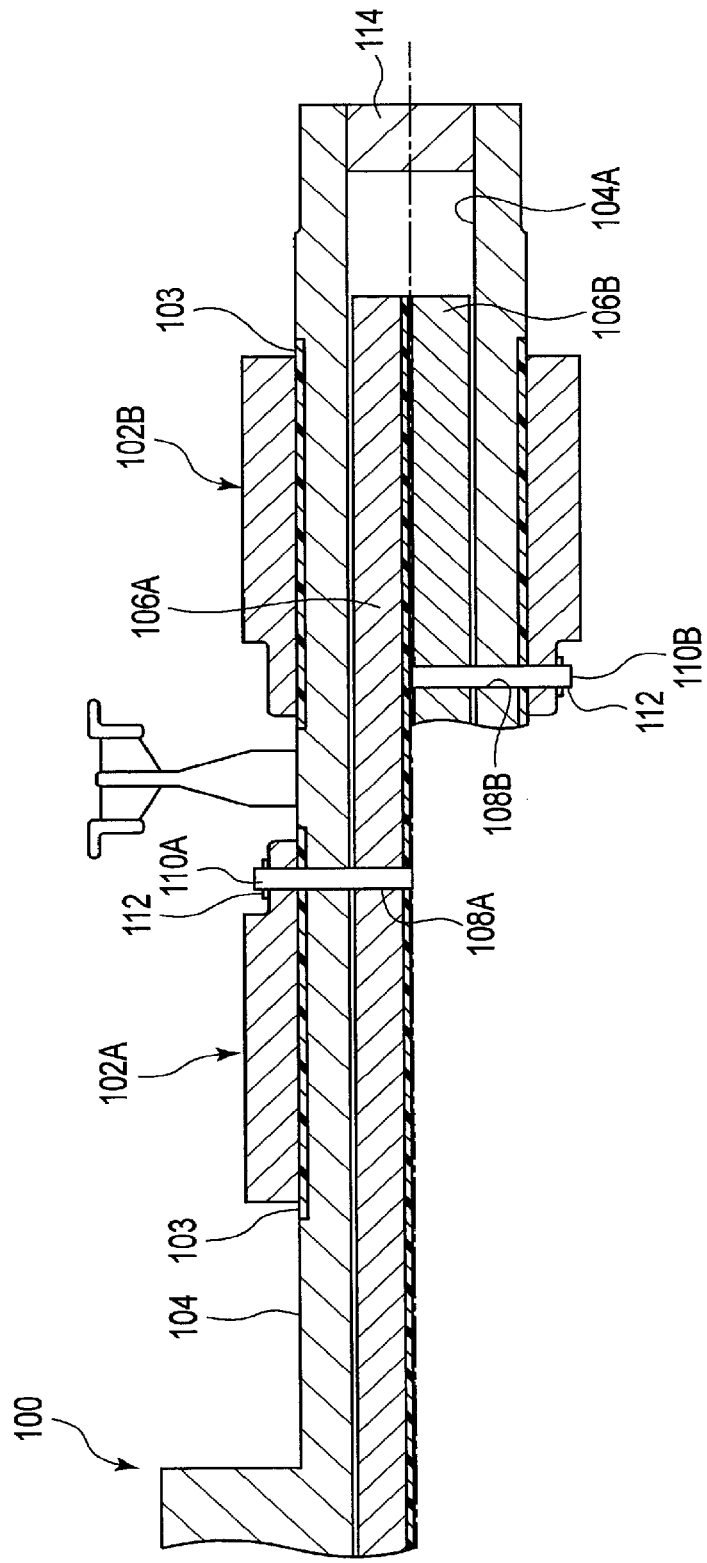
FIG. 9 is a longitudinal cross-sectional view showing an outer projecting portion of a rotor main shaft of a conventional rotating electric machine and a pair of conventional collector rigs located on the outer projecting portion of the rotor main shaft.
Figure 10:
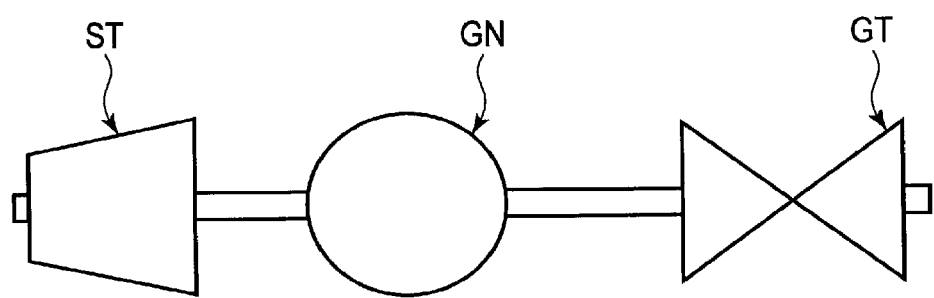
FIG. 10 is a schematic view showing a conventional electric generator as a rotating electric machine of a both shaft drive type.

FIG. 7 shows a fourth embodiment. In this embodiment, a part of a longitudinal lead bar 26' near to the rotor main shaft 10, the part including a distal end curved portion 26'B as a portion of the longitudinal lead bar 26', is configured by stacking metal foils 42, for example copper foils.

<Operation/Effect>

Usually, the longitudinal lead bar 26 having a solid configuration as shown in FIGS. 1-3 tends to thermally expand in it longitudinal direction by heat generated by the field current flowing in the longitudinal lead bar 26. And, since the longitudinal lead bar 26 having the solid configuration as shown in FIGS. 1-3 is fixed in the lead groove 12B by the first collector stud 30A or the second collector stud 30B and the distal end curved portion 26B of the longitudinal lead bar 26 is connected to the longitudinal stud 31, a thermal stress is generated in the longitudinal lead bar 26 when the longitudinal lead bar 26 is heated by the field current flowing in the longitudinal lead bar 26. Therefore, there is a possibility that the thermal stress causes the longitudinal lead bar 26 to be distorted or to be broken with a lapse of time.

However, in a case that the part of the longitudinal lead bar 26' near to the rotor main shaft 10, the part including the distal end curved portion 26'B as the portion of the longitudinal lead bar 26', is configured by stacking metal foils 42, for example copper foils, the part of the longitudinal lead bar 26' near to the rotor main shaft 10 has a flexibility to absorb the thermal expansion and to prevent the longitudinal lead bar 26' from being distorted or broken.

According to an aspect of this embodiment, the whole of the longitudinal lead bar 26' can be configured by stacking metal foils 42, for example copper foils.

Fifth Embodiment

<Configuration>

FIG. 8 shows a fifth embodiment. In this embodiment, each of the longitudinal lead bars 26 being wrapped by the electrically insulating member is retained in each of the lead grooves 12B by a lead bar retainer 28' of an electrically insulating material.

The lead bar retainer 28' works like the lead bar retainer 28 shown in FIG. 2 and used in the first embodiment. That is, after the longitudinal lead bar 26 with being wrapped by the electrically insulating member is firstly inserted in each of the lead grooves 12B, the lead bar retainer 28' is inserted in and engaged with the opening of each of the lead grooves 12B to close the opening of each of the lead grooves 12B. The longitudinal lead bar 26 wrapped by the electrically insulating member is pressed on the inner bottom of each of the lead grooves 12B by the lead bar retainer 28'. Consequently, the lead bar retainer 28' holds the longitudinal lead bar 26 in each of the lead grooves 12B against the centrifugal force generated when the rotor rotates.

<Operation/Effect>

In this embodiment, since the lead bar retainer 28' is made of electrically insulating material, a part of longitudinal lead bar 26 which faces radially outwardly in the lead groove 12B need not to be covered with electrically insulating material. This makes it possible to form a depth of the lead groove 12B being shallow, so that the collector shaft 12 becomes more strength to a torque applied to the collector shaft 12.

According to those embodiments, it is possible to provide a rotor of a rotating electric machine which can increase its reliability and can ease its assembly/maintenance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rotor of a rotating electric machine comprising:
   a rotor main shaft of the rotating electric machine;
   a pair of center hole copper bands arranged in a shaft center portion of the rotor main shaft and held in an insulated state from each other;
   a collector shaft fastened to a shaft end of the rotor main shaft and mounted with a pair of collector rings which supply a field current, on an outer circumferential surface thereof;
   a plurality of longitudinal lead bars inserted in and electrically insulated from lead grooves which are provided in an outer circumferential surface of the collector shaft to extend along a longitudinal direction of the collector shaft, and connected to the collector rings through conductive studs;
   a plurality of radial lead bars arranged at a shaft end portion of the rotor main shaft, the shaft end portion being located on a coupling side with the collector shaft, and including inner end portions connected to the center hole copper bands; and
   a plurality of conductive longitudinal studs inserted into a plurality of longitudinal through holes provided at a shaft end portion of the collector shaft to extend along a longitudinal direction of the collector shaft, the shaft end portion being located on a coupling side with the rotor main shaft, and including one end portions connected to outer end portions of the radial lead bars and the other end portions connected to the longitudinal lead bars.

2. The rotor of a rotating electric machine according to claim 1, further comprising a hydrogen seal at a joint surface between the rotor main shaft and the collector shaft and a hydrogen seal at each of the longitudinal through holes of the collector shaft.

3. The rotor of a rotating electric machine according to claim 1, wherein that the collector shaft is provided with an even number of the lead grooves, and the lead grooves are evenly arranged in a circumferential direction of the collector shaft.

4. The rotor of a rotating electric machine according to claim 1, wherein each of the lead grooves has the same length as to each other.

5. The rotor of a rotating electric machine according to claim 1, wherein the inner end portions of the radial lead bars are connected to end portions of the center hole copper bands by welding, the end portions being a collector shaft side.

6. The rotor of a rotating electric machine according to claim 1, wherein the inner end portions of the radial lead bars are connected to end portions of the center hole copper bands by bolts, the end portions being a collector shaft side.

7. The rotor of a rotating electric machine according to claim 1, wherein a part or the whole of the longitudinal lead bar is configured by stacking metal foils.

8. The rotor of a rotating electric machine according to claim 1, wherein each of the longitudinal lead bars is retained in each of the lead grooves by a lead bar retainer inserted in and engaged with an opening of each of the lead grooves to close the opening of each of the lead grooves.

9. The rotor of a rotating electric machine according to claim 8, wherein the lead bar retainer is made of an electrically insulating material.

10. The rotor of a rotating electric machine according to claim 2, wherein that the collector shaft is provided with an even number of the lead grooves, and the lead grooves are evenly arranged in a circumferential direction of the collector shaft.

11. The rotor of a rotating electric machine according to claim 2, wherein each of the lead grooves has the same length as to each other.

12. The rotor of a rotating electric machine according to claim 2, wherein the inner end portions of the radial lead bars are connected to end portions of the center hole copper bands by welding, the end portions being a collector shaft side.

13. The rotor of a rotating electric machine according to claim 2, wherein the inner end portions of the radial lead bars are connected to end portions of the center hole copper bands by bolts, the end portions being a collector shaft side.

14. The rotor of a rotating electric machine according to claim 2, wherein a part or the whole of the longitudinal lead bar is configured by stacking metal foils.

15. The rotor of a rotating electric machine according to claim 2, wherein each of the longitudinal lead bars is retained in each of the lead grooves by a lead bar retainer inserted in and engaged with an opening of each of the lead grooves to close the opening of each of the lead grooves.

16. The rotor of a rotating electric machine according to claim 15, wherein the lead bar retainer is made of an electrically insulating material.

\* \* \* \* \*